(12) United States Patent
Kauper

(10) Patent No.: US 9,802,258 B2
(45) Date of Patent: Oct. 31, 2017

(54) DRILL HEAD

(71) Applicant: Kennametal Inc., Latrobe, PA (US)

(72) Inventor: Herbert Rudolf Kauper, Erlangen (DE)

(73) Assignee: KENNAMETAL INC., Latrobe, PA (US)

(*) Notice: Subject to any disclaimer, the term of this patent is extended or adjusted under 35 U.S.C. 154(b) by 146 days.

(21) Appl. No.: 14/788,123

(22) Filed: Jun. 30, 2015

(65) Prior Publication Data

US 2016/0001379 A1 Jan. 7, 2016

(30) Foreign Application Priority Data

Jul. 1, 2014 (DE) .......................... 10 2014 212 714

(51) Int. Cl.
*B23B 51/00* (2006.01)
*B23B 51/02* (2006.01)

(52) U.S. Cl.
CPC ............ *B23B 51/009* (2013.01); *B23B 51/02* (2013.01); *B23B 2251/04* (2013.01); *B23B 2251/14* (2013.01); *B23B 2251/18* (2013.01); *B23B 2251/60* (2013.01); *Y10T 408/906* (2015.01)

(58) Field of Classification Search
CPC .............. B23B 51/009; B23B 2251/04; B23B 2251/14; B23B 2251/18; B23B 2251/60; Y10T 408/905; Y10T 408/906
See application file for complete search history.

(56) References Cited

U.S. PATENT DOCUMENTS

| 2,294,969 | A | * | 9/1942 | Engvall | ................... | B23B 51/02 408/224 |
| 2,879,036 | A | * | 3/1959 | Wheeler | ............... | B23B 51/009 175/391 |
| 4,605,347 | A | | 8/1986 | Jodock et al. | | |
| 4,878,788 | A | | 11/1989 | Wakihira et al. | | |
| 4,967,855 | A | | 11/1990 | Moser | | |
| 4,968,193 | A | | 11/1990 | Chaconas et al. | | |
| 5,181,811 | A | * | 1/1993 | Hosoi | ..................... | B23B 51/02 408/230 |
| 5,288,183 | A | | 2/1994 | Chaconas et al. | | |
| 5,957,631 | A | | 9/1999 | Hecht | | |

(Continued)

FOREIGN PATENT DOCUMENTS

DE 69817276 T2 2/2004
EP 1260296 A1 11/2002
(Continued)

OTHER PUBLICATIONS

Abele et al 1, Simulation-based Twist Drill Design and Geometry Optimization Science Directabstract.
Jun. 24, 2015 First office action.

*Primary Examiner* — Eric A Gates
(74) *Attorney, Agent, or Firm* — Matthew S. Bedsole

(57) ABSTRACT

The drill head (2) extends along a rotational axis (24) in the axial direction (22) and has a central area (6) on the front with first main cutting edges (26), an intermediate area (8) connecting thereto, and an outer area (10) in turn connecting thereto with second main cutting edges (30). The intermediate area (8) in this case expands in the axial direction (22) toward the outer area (10) and in particular forms an expanding conical shell. A centering effect is hereby achieved via the intermediate area (8).

8 Claims, 2 Drawing Sheets

(56) References Cited

U.S. PATENT DOCUMENTS

| | | |
|---|---|---|
| 6,050,754 A | 4/2000 | Thomas |
| 6,089,337 A | 7/2000 | Kleine et al. |
| 6,102,634 A | 8/2000 | Turner et al. |
| 6,190,097 B1 | 2/2001 | Thomas |
| 6,227,774 B1 | 5/2001 | Haughton et al. |
| 6,312,432 B1 | 11/2001 | Leppelmeier |
| 6,443,674 B1 | 9/2002 | Jaconi |
| 6,652,203 B1 | 11/2003 | Risen, Jr. |
| 6,857,832 B2 | 2/2005 | Nygard |
| 7,001,120 B2 * | 2/2006 | Moser .................. B23B 51/02 175/385 |
| 7,101,125 B2 | 9/2006 | Borschert et al. |
| 7,131,799 B2 | 11/2006 | Stokey et al. |
| 7,267,514 B2 | 9/2007 | Wetzl et al. |
| RE40,297 E | 5/2008 | Berglund |
| 7,407,350 B2 | 8/2008 | Hecht |
| 7,455,129 B2 * | 11/2008 | Widmann ............. B23B 51/02 175/385 |
| 7,516,686 B2 | 4/2009 | Wang et al. |
| 7,717,654 B2 | 5/2010 | Cirino |
| 7,861,807 B2 * | 1/2011 | Probst .................... B23B 51/02 175/415 |
| 8,021,088 B2 | 9/2011 | Hecht |
| 8,430,609 B2 | 4/2013 | Frejd |
| 8,556,552 B2 | 10/2013 | Hecht |
| 8,784,018 B2 | 7/2014 | Pábel |
| 8,840,347 B2 | 9/2014 | Aare |
| 8,931,982 B2 | 1/2015 | Osawa |
| 9,333,564 B2 * | 5/2016 | Santamarina ......... B23B 51/02 |
| 2003/0017015 A1 | 1/2003 | Strubler |
| 2003/0202853 A1 | 10/2003 | Ko et al. |
| 2009/0087275 A1 | 4/2009 | Goulbourne |
| 2010/0296887 A1 | 11/2010 | Moseley et al. |
| 2014/0308086 A1 * | 10/2014 | Kauper .................. B23B 51/02 408/227 |
| 2016/0263664 A1 | 9/2016 | Son |

FOREIGN PATENT DOCUMENTS

| | | |
|---|---|---|
| GB | 2193913 A | 2/1988 |
| JP | 2001105216 | 4/2001 |
| WO | 2004037472 A1 | 5/2004 |

* cited by examiner

DRILL HEAD

RELATED APPLICATION DATA

The present application claims priority to German Patent Application Number 102014212714.9 filed Jul. 1, 2014 which is hereby incorporated by reference in its entirety.

FIELD

The invention relates to a drill head that extends along a rotational axis in the axial direction and has a central area on the front, with first main cutting edges that extend up to a first radius; and that furthermore has an outer area offset back in the axial direction relative to the central area, with second main cutting edges which extend up to a second outer radius. An intermediate area is formed between the central area on the front and the outer area, and said intermediate area terminates at the central area and connects it with the outer area.

Step drills—as described, for example, in U.S. Pat. No. 7,267,514 B2—have such a design. In step drills, two main cutting edges are formed that are offset axially with respect to one another so that a stepped drill hole is ultimately formed. In step drills, the central area is typically formed as a sort of axially protruding pin. An intermediate area in this case terminates at said pin. In U.S. Pat. No. 7,267,514 B2, this intermediate area tapers conically in the axial direction down to the rearward outer area with the two main cutting edges, such that a clearance is achieved in the region of this intermediate area when drilling.

Drilling tools are often formed as modular drilling tools in which a drill head or at least a front-facing cutting insert is inserted at the front into a carrier. An example of this can be learned from U.S. Pat. No. 7,101,125 B2.

The drills rotate around a center or rotational axis during operation. A tip which should serve for centering the drill is typically formed at the foremost point on the rotational axis. Extremely precise centering of the drill is particularly important for extremely precise creation of drill holes. At the start of the drilling process, there is frequently the problem that the drill is pushed away radially. This is caused by—among other things—the fact that no cutting process takes place in the area of the tip itself because here no relative movement occurs between the work piece and the drill.

The design as a step drill also makes it possible, among other things, to use the front central area as a sort of pilot drill. Also customary are what are known as point thinnings with which the area around the tip is kept as small as possible.

SUMMARY

Starting from here, the object upon which the invention is based is a drill head having an improved centering effect.

The object is achieved according to the invention via a drill head having the features of claim 1. The drill head extends along a rotational axis in the axial direction and has a central area on the front with first main cutting edges which extend up to a first radius. Furthermore, the drill head has an outer area offset back in the axial direction relative to the central area, with second main cutting edges which extend up to a second outer radius, particularly a nominal drill radius. The central area on the front and the outer area are connected to one another via an intermediate area. In order to achieve a good centering effect at the start of the drilling process, it is now provided that the intermediate area expands at an inclination angle in the axial direction, starting from the central area on the front up to the outer area.

Due to the (in particular conically) expanding design of the intermediate area, said intermediate area is designed as a whole approximately in the shape of a conical shell, wherein the cone tapers down to the central area on the front. Therefore, during the drilling process this intermediate area is supported on the work piece and leads to automatic centering of the drill due to its conicity.

With this approach, the intermediate area is thus formed exactly contrary to the typical design of step drills, in which this intermediate area typically tapers in the axial direction in order to prevent contact with the work piece.

The drill head in this case is optionally part of a single-piece drill tool, for example a solid carbide drill. Alternatively, the drill head is part of a modular drill tool in which either the entire drill head can be inserted into a carrier as a replaceable insert, or only part of the drill head is insertable as a replaceable cutting insert.

In an appropriate embodiment, the inclination angle is in a range of between 3° and 15° and preferably in a range of about 7°, in relation to the rotational axis. The intermediate area, i.e. the surface shell that is formed, is thus only oriented at a slight angle with respect to the rotational axis, and thus proceeds comparatively steeply in contrast to the typical flatly oriented main cutting edges. An effective centering is achieved by this inclination angle.

In some embodiments, the intermediate area expands conically as a whole. This is understood to mean that, when viewed in a section plane which is spanned by the rotational axis and a radial direction, the intermediate area extends along a straight line. There may also be rounded edges formed in the transitional area with respect to the outer area that is axially offset back. This is typically due to the fact that the front face of the drill, which is also characterized as the drill face, is preferably produced through grinding. The conical embodiment enables a defined centering due to the straight-line design. Alternatively, it is also possible in principle to form the intermediate area wholly in the form of a rounded edge. In this case, the rounded edge is selected such that the transition points from the intermediate area to the central area on the front on one hand, and to the outer area that is axially offset back on the other hand, are positioned on a straight line which encloses the inclination angle with respect to the rotational axis.

In a further embodiment, there are intermediate cutting edges formed at the intermediate area, which intermediate cutting edges connect the first main cutting edge with the second main cutting edge. The intermediate area is thus formed as a cutting edge overall. Therefore, during the drilling process material removal forces occur in the intermediate area which are decisive for the desired centering effect. Due to the particularly conically inclined design of the intermediate area, these material removal forces act uniformly in the radial direction, such that a desired centering effect is achieved. The individual cutting edges in this case are typically arranged distributed around the circumference in a suitable manner. In one embodiment variant with two effective cutting edges, these cutting edges are preferably positioned rotationally offset by 180°, symmetrically with respect to one another. The respective effective cutting edge in this case is formed by the first main cutting edge, the intermediate cutting edge connected thereto of the intermediate area, and finally the second main cutting edge, again connected thereto, of the outer area. This main cutting edge effectively formed by these three cutting edge areas preferably travels continuously and without interruption from the rotational axis up to a nominal outer radius of the drill head, at which typically an outer cutting corner is formed. If needed, brief interruptions can in principle be placed in these effective cutting edges, which interruptions act as a sort of chip-breaking grooves, for example. Additional cutting edges are preferably not provided.

The first radius of the central area is preferably in a range of between 0.25 to 0.8 times that of the outer radius. As previously mentioned, the outer radius is preferably the nominal radius, such that the first radius is thus in a range of 0.25 to 0.8 times that of the nominal radius. Selection of the size of the first radius in this case depends particularly on the material of the work piece to be machined.

In a suitable further embodiment, the intermediate area extends over an axial length of from 0.1 mm to a maximum of 5 mm in the axial direction.

The axial length in this case is measured particularly as a function of a predetermined feed rate, and in fact preferably such that the entire intermediate cutting edge is already in contact with a work piece to be machined upon a drill rotation, at the start of the drilling process. The axial length in this case is preferably somewhat shorter than the axial feed. This ensures that the intermediate area immediately engages at the start of the drilling process and can thus exert its centering effect. The term "feed" in this case is understood to be the adjusting movement of the drill in the axial direction upon a complete rotation of 360° around the rotational axis. Alternatively, the axial length is selected to be greater than the axial feed and is, for example, 1 to 3 times that of the axial feed.

The feed in this case is typically greatly dependent on the material. Therefore, comparatively small feeds are typically run for hard materials, and larger feeds—for example in a range of one millimeter per rotation—are run for softer materials such as light metals. For harder materials, such as steels, the axial length is thus preferably in a range of only 0.1 mm to 1 mm.

The first main cutting edges of the central area are preferably oriented at a point angle with respect to one another, which point angle is in a range of from 90° to 180°, and particularly in a range of about 140°. Given an embodiment with 180°, a flat drill bit is therefore formed. Preferably, however, the first main cutting edges are oriented roof-shaped at the specified point angle, particularly in a range of about 140°.

Furthermore, the second main cutting edges of the outer area are also suitably oriented with respect to one another at a point angle which is within this range. They are particularly oriented with respect to one another in the shape of a roof. They are preferably oriented with respect to one another at the same point angle as the first main cutting edges. Alternatively, the two point angles are different with respect to one another.

Furthermore, it is suitably provided that chip flutes be placed in the intermediate area, and preferably up to the central area on the front. The chip flutes respectively terminate at the individual cutting edges of the respective area (central area, intermediate area, outer area).

An exemplary embodiment of the invention is explained in more detail in the following by means of Figures.

DETAILED DESCRIPTION

Figure 1:
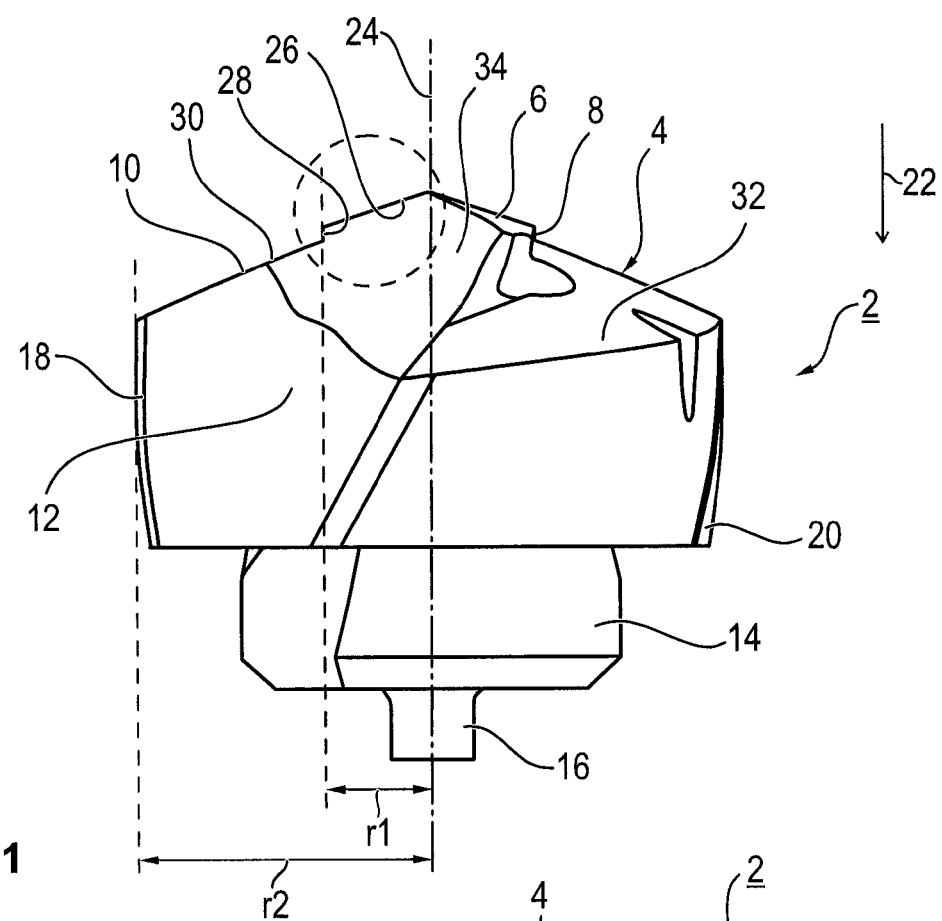
FIG. 1 illustrates a drill head in a side view, which is designed as a replaceable drill head for a modular drilling tool.
Figure 2:
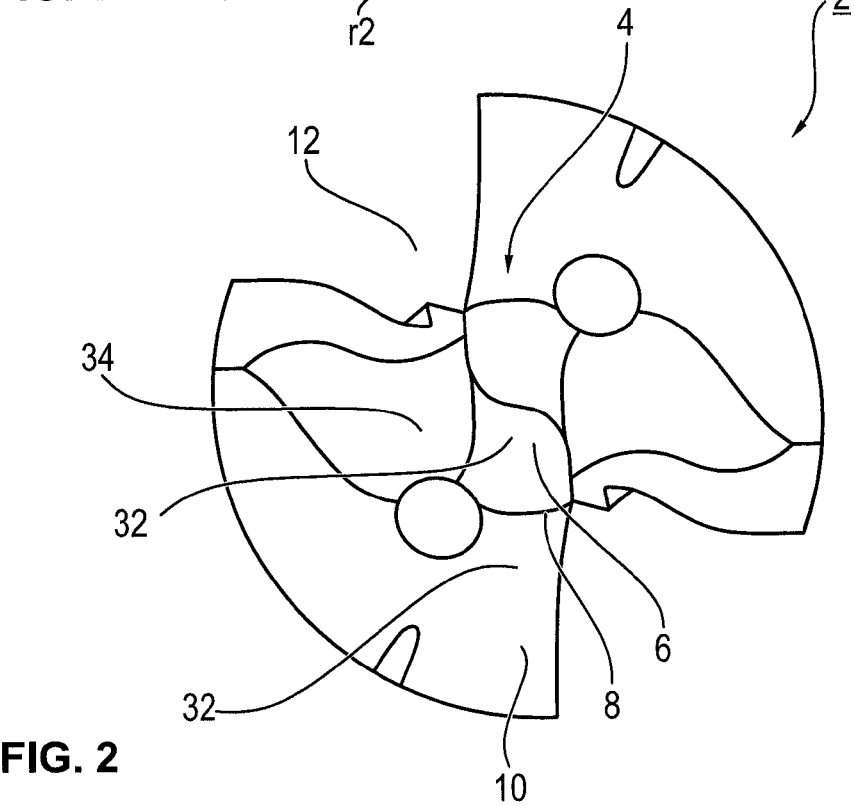
FIG. 2 illustrates a drill head comparable to that in FIG. 1, with a view of its drill face.

FIGS. 1 and 2 show a drill head 2 which, in some embodiments, is formed as a replaceable drill head for insertion into a carrier (which is not shown in more detail here) of a modular drilling tool.

The drill head has a drill face 4 as the front face. This drill face 4 is wholly formed by three sub-areas, namely a central area 6 on the front, an intermediate area 8, and an outer area 10. A total of two chip flutes 12 are introduced into the drill head, which chip flutes 12 extend in the shape of a helix in the exemplary embodiment. These are typically continued in a shaft area of the carrier.

The drill head 2 has a coupling pin 14 on its side opposite the drill face 4, with a connecting lead-in pin 16. A detachable connection with the carrier is formed via the coupling pin 14. A respective secondary cutting edge 18, at which a support or guide chamfer 20 connects to a drill back of the drill head 2 in the circumferential direction, runs along the chip flute 12.

The entire drill head 2 extends in an axial direction 22 along a rotational axis 24 around which it rotates during operation. The rotational axis 24 defines a center axis.

The central area 6 on the front has two first main cutting edges 26 which, starting from a center, extend in approximately a radial direction outward up to a first radius $r_1$. Intermediate cutting edges 28 of the intermediate area 8 adjoin these first main cutting edges 26. Second main cutting edges 30 of the outer area 10, which extend up to a nominal radius $r_2$ of the drill head 2, then in turn adjoin these first main cutting edges. Thus, the radius of the drill hole created is defined via the nominal radius $r_2$. In the exemplary embodiment, the drill head 2 is formed rotationally symmetrically around the rotational axis 24 with respect to a 180° rotation.

Figure 3:
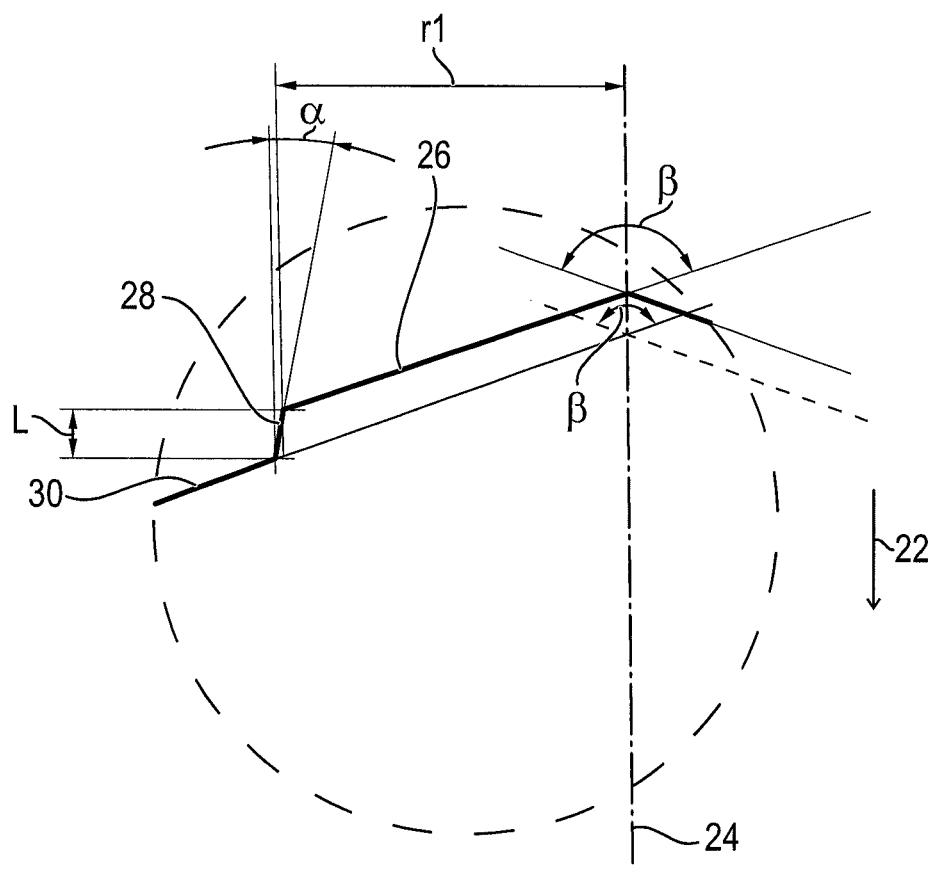
FIG. 3 illustrates an enlarged, diagrammed representation of the area indicated with a circle in FIG. 1.

As can particularly be seen from the enlarged, diagrammed representation in FIG. 3, the intermediate area 8 is formed overall as a conically expanding intermediate area 8 in the axial direction 22, thus in the direction from the drill face 4 to a rearward area. Thus, the intermediate area 8 is formed wholly as an expanding conical shell. The intermediate area 8 in this case is oriented at an inclination angle α with respect to the axial direction 22. The inclination angle α is preferably in a range of between 3° and 15°, and approximately 11° in the exemplary embodiment.

At the same time, both the first main cutting edges 26 and the second main cutting edges 30 are oriented at a point angle β with respect to one another, which is preferably in a range of between 120° and 150° and is approximately 140° in the exemplary embodiment. Alternatively, the two point angles β are formed differently. In this case, the point angle β of the first main cutting edges 26 is greater than or less than the point angle β of the second main cutting edges 30.

The first radius $r_1$ is preferably in a range of between 0.25 to 0.8 times that of the nominal radius $r_2$. Preferably, it tends to be in the lower range, i.e. in a range of between 0.25 and 0.4 times that of the nominal radius, for example. In the exemplary embodiment, it is about one-third that of the nominal radius $r_2$.

The intermediate area 8 further extends over an axial length L which as a whole is of comparatively short dimension, at least as compared to the conventional designs of step drills. It is preferably in a range between 0.1 mm and 2 mm. Depending on the material to be machined, the axial length L may also be more than this, for example up to a maximum of 5 mm.

The embodiment of the drill face 4 described here, with the intermediate area 8 expanding at an inclination angle α, may in principle be formed with different face geometries for drills that are known per se. Thus, FIG. 2 shows as an example a grinding face as a type of conical shell cut, in which a respective effective main cutting edge respectively connects to an approximately conical flank 32. In addition, a point thinning 34 is introduced into this flank in a known manner to taper a core area of the drill. An effective main cutting edge here is understood to be in particular the uninterrupted, continuous cutting edge which is formed by the three sub-areas: first main cutting edge 26; intermediate cutting edge 28; and second main cutting edge 30.

Furthermore, it is to be learned from FIG. 2 that—given the grinding face of the drill face 4 selected here—the two first main cutting edges 26 are connected to one another via a crosscut, which means that an approximately S-shaped cutting edge is formed.

In addition to the grinding face of the drill face 4 shown here, what are known as four-surface grinding faces etc. that are known per se are also used for the drill face 4.

Due to its conical design, the intermediate area 8 forms a centering area and has a centering effect during the drilling process. Due to its inclination, it engages with the work piece to be machined. As a result of the intermediate cutting edges 28, there is machining of the work piece in the intermediate area 8. This causes material removal forces to occur which have a radial component in the direction of the rotational axis 24. Due to the rotationally symmetrical design, these material removal forces that occur have an effective centering effect, and the entire drill head 2—and thus the drill—is effectively centered.

The invention claimed is:

1. A drill head extending along a rotational axis in an axial direction and comprising:
    a central area on a front portion of the drill head, with first main cutting edges which extend up to a first radius;
    an outer area, offset rearwardly in the axial direction relative to the central area, with second main cutting edges extending up to a second outer radius; and
    an intermediate area extending in the axial direction, which terminates at the central area and connects the central area with the outer area, the intermediate area having intermediate cutting edges formed thereon, the intermediate cutting edges connecting the first main cutting edges with the second main cutting edges,
    wherein the intermediate area extends in the axial direction up to the outer area at an inclination angle, the inclination angle being in a range between 3° and 15° in relation to the rotational axis
    wherein the second main cutting edges are oriented with respect to one another at the same point angle as the first main cutting edges.

2. The drill head according to claim 1, wherein the intermediate area expands conically.

3. The drill head according to claim 1, wherein the first radius of the central area is in a range between 0.25 to 0.8 times that of the outer radius.

4. The drill head according to claim 1, wherein the intermediate area extends in the axial direction over an axial length in a range of from 0.1 mm to 5 mm.

5. The drill head according to claim 1, wherein the first main cutting edges of the central area are oriented at a point angle with respect to one another, which is in a range of from 90° to 180°.

6. The drill head according to claim 5, wherein the point angle is about 140°.

7. The drill head according to claim 1, wherein a chip flute is placed in the central area.

8. A drill head extending along a rotational axis in an axial direction and comprising:
    a central area on a front portion of the drill head, with first main cutting edges which extend up to a first radius, the first main cutting edges being oriented at a first point angle with respect to one another in a range of from 90° to 180°;
    an outer area, offset rearwardly in the axial direction relative to the central area, with second main cutting edges extending up to a second outer radius, the second main cutting edges being oriented at a second point angle with respect to one another, the second point angle being equal to the first point angle; and
    an intermediate area extending in the axial direction, which terminates at the central area and connects the central area with the outer area,
    wherein the intermediate area extends in the axial direction up to the outer area at an inclination angle,
    wherein the inclination angle is in the range between 3° and 15° in relation to the rotational axis; and wherein the intermediate area has intermediate cutting edges formed thereon, the intermediate cutting edges connecting the first main cutting edges with the second main cutting edges.

* * * * *